(12) United States Patent
Heinrich et al.

(10) Patent No.: US 6,460,139 B1
(45) Date of Patent: Oct. 1, 2002

(54) APPARATUS AND METHOD FOR PROGRAMMABLY AND FLEXIBLY ASSIGNING PASSWORDS TO UNLOCK DEVICES OF A COMPUTER SYSTEM INTENDED TO REMAIN SECURE

(75) Inventors: David F. Heinrich, Tomball, TX (US); Hung Q. Le, Katy, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/196,549

(22) Filed: Nov. 20, 1998

(51) Int. Cl.⁷ ................................................ H04L 9/00
(52) U.S. Cl. ...................................................... 713/200
(58) Field of Search .................................. 713/200, 202

(56) References Cited

U.S. PATENT DOCUMENTS

| | | | | |
|---|---|---|---|---|
| 5,537,544 A | * | 7/1996 | Morisawa et al. | 395/188 |
| 5,748,888 A | | 5/1998 | Angelo et al. | 395/186 |
| 5,887,131 A | * | 3/1999 | Angelo | 395/188.01 |
| 6,138,240 A | * | 10/2000 | Tran et al. | 713/202 |
| 6,145,085 A | * | 11/2000 | Tran et al. | 713/202 |
| 6,233,635 B1 | * | 5/2001 | Son | 710/126 |

OTHER PUBLICATIONS

ACQURA.COM: 12C Bus Evaluation Boards Copyrighted 2000. pp. 1–2.*

* cited by examiner

*Primary Examiner*—Gail Hayes
*Assistant Examiner*—Leynna Ha
(74) *Attorney, Agent, or Firm*—Kevin L. Daffer; Conley, Rose & Tayon P.C.

(57) ABSTRACT

A computer system, bus interface unit, and method is provided for programmably modifying securable resources of the computer. Those resources may be devices which can be coupled to peripheral buses of the computer, or which may contain or allow access to sensitive information that must be secured against improper access. The security system thereby functions to block accesses to certain devices based on the status of the user seeking access. Passwords stored in the security system are matched against locally and distally entered passwords from either the user of that particular computer system, an administrator of a subset of localized computer systems, or a system administrator in charge of all networked computer systems. The present security system is thereby hierarchical in nature and can be programmed by the system administrator such that the assignment of unlocked signals arising from password comparisons can be programmably mapped to various securable devices. In this fashion, a user can gain access to certain resources at one time and then later, based on the system administrator re-programming a slot assignment register, the user may no longer be given access to that device. The system administrator can therefore impart flexibility to device security mechanisms that exist within personal computers.

18 Claims, 4 Drawing Sheets

FIG. 6

| FIELD A | FIELD B | FIELD C | FIELD D | FIELD E | FIELD F | FIELD G | FIELD H | FIELD I |
|---|---|---|---|---|---|---|---|---|
| I²C EEROM | I²C DEVICE BY. | CMOS1 | CMOS2 | FLASH MEM. | IDE | MPIO REG. | HOOD | SUPER I/O REG. |

| BIT FIELD | PWR. ON | ATTR. | DESCRIPTION |
|---|---|---|---|
| 000 | 0 | R/W0 | NO PW. PROTECTION |
| 001 | 0 | R/W0 | SLOT0 |
| 010 | 0 | R/W0 | SLOT1 |
| 011 | 0 | R/W0 | SLOT2 |
| 100 | 0 | R/W0 | SLOT0 AND SLOT1 |
| 101 | | R/W0 | RESERVED |
| 110 | | R/W0 | RESERVED |
| 111 | | R/W0 | RESERVED |

APPARATUS AND METHOD FOR PROGRAMMABLY AND FLEXIBLY ASSIGNING PASSWORDS TO UNLOCK DEVICES OF A COMPUTER SYSTEM INTENDED TO REMAIN SECURE

BACKGROUND OF THE INVENTION

1. Field of the Invention

This invention relates to computer system security and, more particularly, to an apparatus and method for assigning passwords to various devices of a computer system and programmably altering that assignment to impart flexibility in the locking and unlocking of those devices with different levels of password security.

2. Description of the Related Art

Securing a computer system involves preventing unauthorized access to sensitive data and/or instructions contained within various hardware resources attributed to that system. The terms "instructions" and "data" refer generically to all forms of electronic information, including data entries and files created by the instructions as well as the executable instructions themselves.

Typically a computer system will include a plurality of hardware resources, henceforth referred to as "devices." A group or set of devices may contain sensitive information and therefore must be periodically secured. Alternatively, a device may be an electromechanical mechanism, such as a latch, which prevents unauthorized access to the interior of the computer chassis. Thus, device is interchangeable referred to as a hardware resource that either contains sensitive information or provides a gateway, or securement, to that information. One form of securement involves a technique known as "password matching."

Upon reset or boot-up of the computer system, a password stored within non-volatile memory will be entered into volatile memory proximate to a comparator. The previously stored password can then be compared against a user-entered password to determine if the user is allowed access. Typically, the volatile memory which receives the previously stored password, as well as a comparator locally linked to the volatile memory, are contained in what is often referred to as a "black box". Description of a black box security device is generally set forth in U.S. Pat. No. 5,748,888 (herein incorporated by reference).

The password stored in non-volatile memory, and loaded into the black box during boot-up, is derived from either a battery-backed CMOS static RAM memory, electrically programmable or electrically erasable non-volatile memory (i.e., EEPROM, EEROM or Flash ROM). The non-volatile memory is generally contained within a device linked to a peripheral bus of a computer system. During boot-up operation, the computer Basic Input Output System (BIOS) will load the stored password from non-volatile memory into the black box where it can then be compared against a user-entered password. If a match occurs, then an unlock signal can be forwarded from the black box across a conductor or "slot".

A black box security device may be configured to receive multiple stored passwords and therefore can match against multiple user-entered passwords against the stored passwords. In this fashion a black box may serve to compare respective dissimilar pairs of stored and user-entered passwords. This allows a user to enter a first password to gain access to only his or her computer, whereas a system administrator can enter a second password mutual to numerous computers across, for example, a network of computers.

Each slot of a black box may therefore be attributed to the comparison result of a previously stored and currently entered password. Since multiple stored and entered passwords can exist, multiple slots occur, each indicating either a lock or unlock signal status for a respective matched password pair.

Conventional black box security systems hardwire the slot output to various securable devices. More specifically, a first slot output from the black box is routed to, for example, a first set of devices and a second slot is routed to a second set of devices. Unfortunately, hardwiring or fixing a connection from a slot to a respective group of devices does not allow a system administrator flexibility to change the slot assignments.

It would be desirable to introduce a computer system which can programmably map a slot output from a black box to various securable devices. The system administrator can thereafter programmably modify the slot mapping assignments to impart flexibility on who should be granted access to various peripheral devices. This will afford benefit to the system administrator of allowing or disallowing select individuals or groups from accessing, and thereby modifying, any secured device attributed to a computer system.

SUMMARY OF THE INVENTION

The problems outlined above are in large part solved by an improved computer security system hereof. The security system encompasses a volatile memory medium. According to one embodiment, the security system includes a slot assignment register which receives the hardwired slot outputs from the black box and re-routes that output, i.e., maps that output to various devices requiring security. The slot assignment register contains multiple fields, each having a series of bits which can be programmed by the system administrator once that administrator is given access.

Each field of the slot assignment register is assigned to a particular securable device. The field can be programmed to accept one of the various slots emanating from the black box, or possibly a subset of slots. Still further, the fields can be programmed to possibly accept no black box protection whatsoever. The number of bits within each field corresponds to possibly the number of slots accommodated by the black box and/or possibly the number of slot combinations which the device assigned to the field will accept.

In order to account for a hierarchical or prioritize slot assignment, an encoder (or logic unit) may be coupled between the volatile memory and the slot assignment register. The encoder may serve to encode various groupings of slot signals and place the encoded output on a field entry within the slot assignment register programmed to the receive the coded slot. For example, the encoder may recognize a priority of slot 2 being higher than slot 0 or slot 1. In this manner, the encoder will forward an unlocked signal of slot 2 to all fields programmed to either slot 1 or slot 0, as well as to all fields programmed to slot 2. This allows a system administrator unlock signal on the higher priority slot 2 to unlock devices assigned to slots 0, 1, and 2. In this example, a system administrator having the highest password security can unlock all securable devices. However, a lower prioritized user of a particular computer or workstation will only be allowed access to a subset of securable devices on his or her computer but not all devices of his or her computer.

According to one embodiment, a computer system is provided incorporating a plurality of securable hardware devices. The computer system includes a keyboard and a storage unit operably coupled to the keyboard. The keyboard includes any device into which a user can enter data. Also, the password could simply be implemented as a hash, absent a black box, wherein the hash can be used to decrypt an entered password and compare the decrypted results with the previously stored data. The storage unit is adapted to produce an unlocked signal upon an output conductor of the storage unit if a stored password within the storage unit favorably compares with a password entered upon the keyboard. A register is operably coupled to the storage unit to direct the unlock signal to a first set of the plurality of hardware devices during a first time and to direct the unlock signal to a second set of the plurality of hardware devices partially dissimilar from the first set during a second time subsequent to the first time. In this manner the register is programmable to alter the mapping of the unlock signal from one hardware device to another. The register may be further coupled to direct another unlock signal upon another output conductor (or slot) of the storage unit to the first set of the plurality of hardware devices during the first time. In this manner, two or more slots, and associated unlock signals can be mapped to the same set of hardware devices.

According to another embodiment, a bus interface unit is provided between a plurality of buses upon which a plurality of devices are coupled. The bus interface unit includes a storage unit configured to retain a first stored password and a second stored password. A comparator is coupled to the storage unit for comparing a first user entered password and a second user entered password against the first and second stored passwords, respectively. The comparator can then present a first unlock signal from a first slot and a second unlock signal from a second slot if the first and second user entered passwords favorably compare with respective first and second stored passwords. A register is operably coupled to the comparator for programmably mapping the first slot to a first grouping of the plurality of devices and for mapping the second slot to a second grouping of the plurality of devices. The first grouping of devices may be a subset of the second grouping of devices, such that the first grouping of devices may be unlocked in response to either (i) the first unlock signal forwarded thereto via the mapped first slot, or (ii) the second unlock signal forwarded thereto by the mapped first slot. The first user entered password is presented to the comparator from a keyboard directly coupled to one of the plurality of buses, and when the second user entered password is presented to the comparator from a keyboard remotely coupled to one of the plurality of buses. Thus, the second user entered password may be entered from a system administrator often distantly connected to the computer of interest.

According to yet another embodiment, a method is presented for unlocking a plurality of securable hardware devices operably connected to a computer system. The method involves multiple steps, some of which include comparing a user-entered password against a stored password. A first unlock signal can then be presented upon a first slot conductor if the user-entered password is the same as the stored password. The first slot conductor can then be mapped to a first grouping of the plurality of securable hardware devices during a first time. During a second time subsequent to the first time, the first slot conductor can be mapped to a second grouping to a plurality of securable hardware devices. In the interim between the first and second times, a slot assignment register is re-programmed so that the first slot conductor is re-routed.

BRIEF DESCRIPTION OF THE DRAWINGS

Other objects and advantages of the invention will become apparent upon reading the following detailed description and upon reference to the accompanying drawings in which:

FIG. 6 is a block diagram of the slot assignment register having a plurality of fields, each of which is attributed to a respective device for programmably receiving bits indicative of a slot assigned to that device; and FIG. 7 is a table of various bits which can be programmed into the plurality of fields within the slot assignment register, and the slot or slots encoded by those bits.

Figure 1:
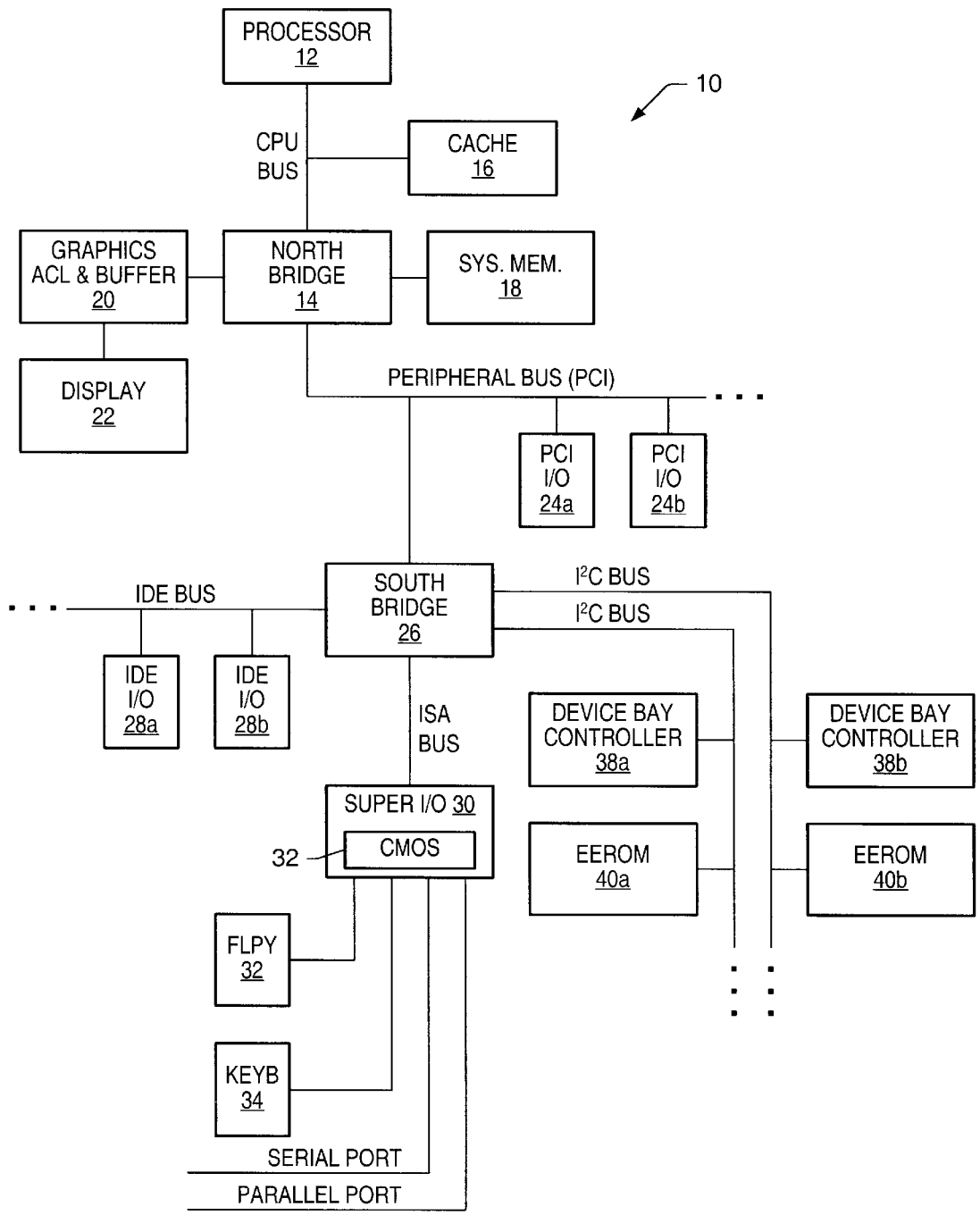
FIG. 1 is a block diagram of a computer system comprising various buses and bus interface units.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and multiple peripheral buses. In the example shown, the peripheral buses include an ISA/EISA bus, an IDE bus and a I$^2$C bus. The CPU bus connects a CPU or processor 12 to a bus interface unit or northbridge 14. A cache memory 16 can be embodied within or external to CPU 12.

Northbridge 14 provides an interface between components clocked at dissimilar rates. According to one embodiment, northbridge 14 interfaces a slower PCI bus and a faster CPU bus. Northbridge 14 may also contain a memory controller which allows communication to and from system memory 18. A suitable system memory 18 comprises DRAM or synchronous DRAM ("SDRAM"). Northbridge 14 may also include graphics support to allow communication to a graphics accelerator and buffer 20. A graphics support, included within an advanced graphics port such as the Accelerated Graphics Port (AGP), provides a high performance, component level interconnect targeted at three dimensional graphics display applications and is based on performance extensions or enhancements to PCI.

AGP interfaces are generally standard in the industry, the description of which is available from Intel Corporation. Generally speaking, AGP is physically, logically, and electrically independent of the PCI bus and is intended for the exclusive use of a display device 22. Display 22 is any electronic display upon which an image or text can be presented. A suitable display 22 includes a cathode ray tube (CRT), a liquid crystal display (LCD), etc.

Northbridge 14 is generally considered an application specific chip set, or application specific integrated circuit (ASIC) that provides connectivity to various buses, and integrates other system functions such as memory interface and P1394. System memory 18 is considered the main memory and refers to a portion of addressable memory that the majority of memory accesses target. System memory 18 is considered the largest continuous memory space of computer 10.

Northbridge 14 contains various sub-components, some of which serve as an interface to processor 12, system memory 18 and the graphics accelerator or frame buffer associated with display 22. A PCI interface is also included within northbridge 14 to allow accesses to and from input/output (I/O) devices 24 connected to the PCI bus.

Also connected to the PCI bus is a southbridge 26. Southbridge 26, similar to northbridge 14, includes various interfaces or controllers connected to respective peripheral buses. In the example shown, a controller or interface exists within southbridge 26 to handle communication between devices on the PCI bus, the IDE bus, the ISA bus and the $I^2C$ bus. The controller or interface units serve to adapt a transfer protocol from one bus to that of another. The interfaces also provide buffers to handle what could be substantially dissimilar transfer rates between buses.

Associated with each bus is a device, some of which do not need to be secured and some of which do. For example, the IDE bus includes peripheral devices 28, a popular IDE device being an IDE hard disk drive. Of course, numerous other peripheral devices may be connected to the IDE bus, and thereby granted access to computer system 10. In the example shown, an ISA bus is also connected to southbridge 26. According to known terminology, various controllers of multiple ISA type devices can be embodied upon a single monolithic substrate, and deemed a super I/O 30. For example, a floppy drive 32, as well as keyboard 34, and the serial/parallel ports are coupled to the ISA bus via controllers within super I/O 30. Information regarding super I/O 30 can be obtained from, e.g., National Semiconductor Corp. For example, the super I/O 30 can embody a real time clock (RTC) and a battery-backed CMOS RAM memory 32. The CMOS RAM memory, henceforth referred to as CMOS stores system configuration information and keeps track of the time of day (i.e., RTC). Of further significance, CMOS 32 may include a password that is maintained even if power to computer 10 is terminated. As will be described herein below, protection against accessing that password can be regulated by a system administrator and, more particularly, the security system hereof Further coupled to southbridge 26 is at least one $I^2C$ bus. The $I^2C$ bus is a fairly well documented peripheral bus, similar to the ISA bus and the IDE bus. Details regarding the $I^2C$ bus protocol is available from Phillips Semiconductor, for example. An $I^2C$ bus typically contains a serial data line and a serial clock line. The $I^2C$ bus is therefore a bi-directional, two-line communication system between different devices or modules. Before data is transmitted on the $I^2C$ bus, the device which should respond is addressed first. The addressing is always carried out with the first byte transmitted after the start procedure. Multiple $I^2C$ devices can be linked to each $I^2C$ bus. For example, many microcontrollers can be coupled to each bus and, as shown, a device bay controller 38 and at least one electrically erasable, non-volatile memory 40 can also be connected.

Device bay controllers are generally well known, and contain an interface which couples between the $I^2C$ bus and a device which can be removably coupled to the controller. For example, a CD ROM, tape drive, etc., can be removably coupled to pins on the device bay controller to allow data to be read from the removable device and placed across the $I^2C$ bus. Memory 40 includes any memory which is non-volatile and can be electrically erased and re-programmed. As such, memory 40 includes an EEROM, which can accommodate a password, similar to CMOS 32. For example, EEROM 40 and CMOS 32 may contain passwords which are periodically programmed therein. Those passwords should be secured, and should only be modified by a person or persons who have proper hierarchical authority. For example, a system administrator of a networked workstation may be granted access to EEROM 40 or CMOS 32, but not someone lower in the hierarchical status such as a user of that particular workstation.

Figure 2:
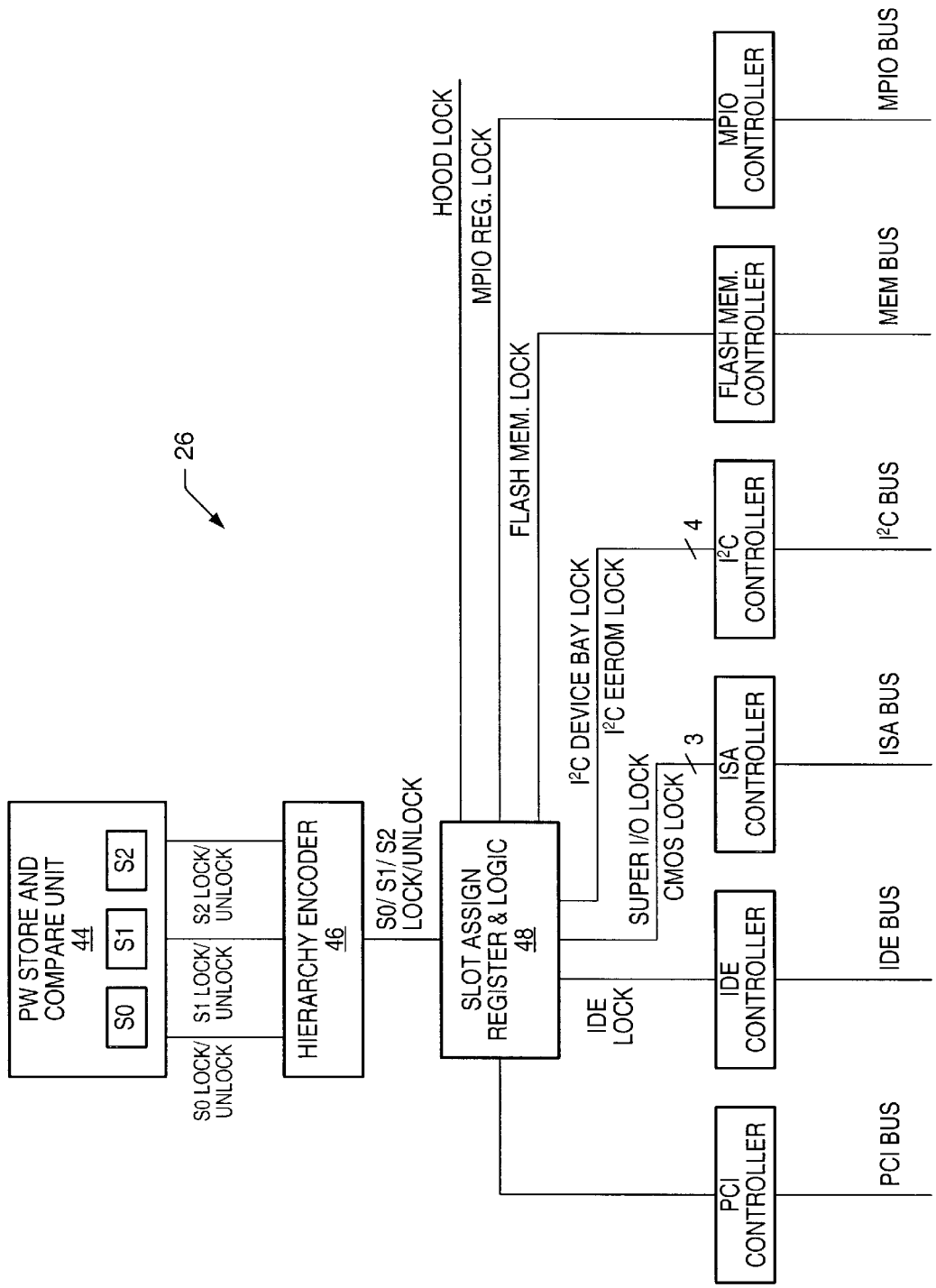
FIG. 2 is a block diagram of a bus interface unit coupled between various peripheral buses and having a password storage mechanism and a slot assignment register which can be programmed to alter its slot routing so as to re-route a lock (or unlock) signal from one device to another device within a plurality of devices which may be coupled to the peripheral buses.

FIG. 2 illustrates components of southbridge 26. Those components include a volatile storage and comparator unit 44. Unit 44 can be alternatively deemed a "black box". Unit 44 preferably comprises a command register and a decoder, a data/status register, a register file, and password verification or comparator logic. Also included with unit 44 is at least one conductor or slot across which a comparator outcome is forwarded to a device or set or devices programmably coupled to the slot. In the example shown, three slots "S0", "S1" and "S2" are provided.

The operation of unit 44 is best illustrated in reference to both FIGS. 1 and 2. During boot-up or reset of computer 10, the flash ROM or EPROM which contains BIOS instructs computer 10 to fetch one or more passwords stored within CMOS 32 and/or EEROM 40. The fetched passwords are then loaded into the memory or storage unit 44. The stored password is then subsequently compared against any passwords entered upon the computer keyboard. The desire to maintain security of passwords within EEROM 40 or CMOS 32 is pivotal on preventing unwarranted users from changing that password and thereby gaining access to critical information contained in, for example, IDE hard drives, etc.

Verification or comparison logic within unit 44 matches the keyboard-entered password with the previously stored password (derived from non-volatile memory). If a match occurs, then an unlocked signal is presented on a respective slot.

In the example shown, three passwords can be stored and verified against so that the comparison result (lock or unlock) is presented on a corresponding slot output. Multiple stored passwords can be retrieved, each dedicated to possibly the user of that workstation only, a system administrator who can access many computers in a network, including the present computer, and possibly a localized administrator who can access only a subset of the networked computers. Given the priority of the system administrator accesses over accesses of a single user, one slot may be dedicated solely to the system administrator matching outcome. In the example described below, that slot may be designated S2. The outcome of a single user password verification can be of low priority and assigned to another slot, possibly S0. Yet a further slot S1 can be dedicated to a localized administrator who can access only a subset of the total number of securable devices. The hierarchical nature of assigning slots to password matching results proves beneficial if the system administrator wants to access all devices, including those dedicated to certain users as well as the password storage resource (i.e., non-volatile memory). Thus, a hierarchy, chain or priority scheme can be set up to provide less access to secured devices for some individuals and more to others. In the example provided, S0 devices can be a subset of S1 devices, and S1 devices can be a subset of S2 devices. Alternatively, S0 and S1 devices are at the same level of hierarchy and both are a subset of S2 devices. A single user may be allowed to modify S0 devices; however, a system administrator is needed to modify S2 devices, which include S0 and S1 devices.

A hierarchy encoder 46 is coupled to the output of unit 44 and specifically the slot conductor outputs. Given that S2 is higher priority than either S0 or S1, all S2 outputs are routed to lower priority slot input by virtue of the encoding scheme set forth within encoder 46. Thus, any unlock signal upon S2 is routed as an unlock signal not only to slot S2, but also to the lower priority slots S0 and S1. Output from encoder 46 can then be presented to a slot assignment register. Register 48 contains a plurality of fields, each of which comprises a series of bits. The bits are programmed during boot-up by retrieving a bit code from non-volatile memory. Each field is assigned to a particular device, or a portion of that device. In the example shown, register 48 contains nine fields assigned to IDE lock, CMOS lock (2 portions), I$^2$C device bay lock, I$^2$C EEROM lock, super I/O configuration register lock, flash memory lock, multi-purpose input/output (MPIO) register lock, and hood lock. Depending on which slot bears an unlock signal, and the hierarchical nature of that slot, either S0, S1 or S2 will embody an unlock signal. Logic within register 48 is thereby used to receive the field bit code and to route the slot output from encoder 46 to the corresponding device based on the result of a logical comparison of the programmed field code and a corresponding slot address/identifier.

Figure 3:
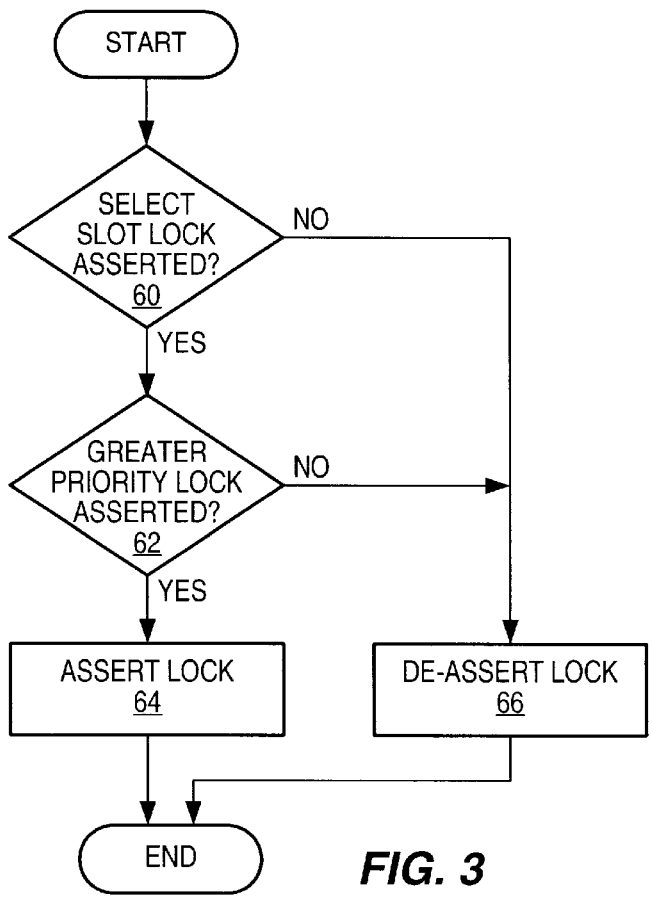
FIG. 3 is a flow diagram of code used to compile the hierarchy encoder and slot assignment register of FIG. 2 in order to determine if a lock (or unlock) signal associated with a particular slot arising from the hierarchy encoder will lock (or unlock) a device having a field code within the slot assignment register programmed for that slot.

FIG. 3 illustrates a flow diagram used to indicate whether a device is to be asserted as locked or de-asserted as unlocked. If the device is to remain locked then the slot assigned to that device must have a lock asserted signal (i.e., it must not contain an unlock signal) as shown by reference numeral 60. If the slots of greater priority are also not unlocked 62 (i.e., are lock asserted), then lock will be asserted for that particular device 64. If either the assigned slot or the higher priority slot is unlocked (lock is not asserted), then the assigned device will be unlocked 66 (i.e., lock signal will be de-asserted). FIG. 3 illustrates but one example of a security system employing multiple slots arising from a black box and the hierarchical nature by which signals on those slots will either unlock an assigned device or maintain that device's locked status.

Figure 4:
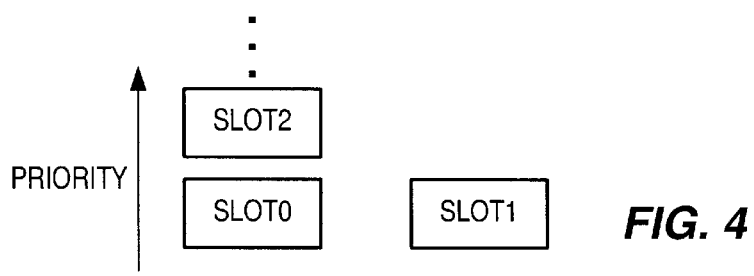
FIG. 4 is a hierarchy of slot assignments encoded by the hierarchy encoder, according to one embodiment.
Figure 5:
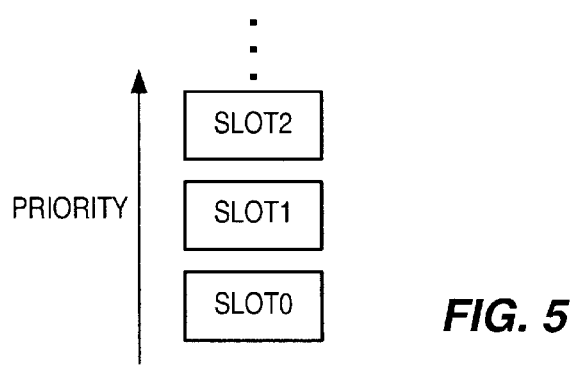
FIG. 5 is a hierarchy of slot assignments encoded by the hierarchy encoder, according to another embodiment.

FIGS. 4 and 5 further illustrate hierarchical assignments assigned to the black box slots. For example, slots 0 and 1 can be assigned the same priority, but less than slot 2. Alternatively, slot 1 can be assigned a higher priority than slot 0 but less than slot 2. The priority scheme set forth in FIGS. 4 and 5 are merely examples. More than three slots, or more than two hierarchical schemes, can be employed depending on the number of bits are contained within each field.

FIG. 6 illustrates nine separate and distinct fields reserved for nine separate and distinct devices. Of course, the slot assignment register can encompass more or less than nine fields, whereby each field can be any securable device and not simply those illustrated. For example, the field code programmed within field A is forwarded to logic which will respond by connecting the slot programmed within field A to I$^2$C EEROM. The same applies for each of the other fields which make up slot assignment register 48.

FIG. 7 illustrates an example of various bit codings which can be programmed into each field of the slot assignment register. As shown, if pattern 000 is programmed into a field during a time in which power is applied (i.e., power on or boot-up) then no password protection is applied to the devices assigned to that field. However, if a field is programmed to 001, then that device will be assigned to slot 0. This means that if an unlocked signal arises upon slot 0, as output from the hierarchical encoder, then all fields and corresponding devices programmed to slot 0 will be unlocked.

Referring to FIGS. 6 and 7, an example may best illustrate the programmable nature of register 48, and the benefit of having a system administrator program bits within fields to periodically change the securable status of devices attributed to those programmable fields. More specifically, if field A is programmed as 011, then field A will be programmbly assigned to slot 2. Any unlock signal on slot 2 will unlock the I$^2$C EEROM. If matching of system administrator entered passwords is required to produce an unlock signal on slot 2, then only the system administrator can unlock I$^2$C EEROM. If field B is programmed as 001, then field B is assigned to slot 0. Any unlock signal on slot 0 will unlock the device bay controller, thus allowing access to a removable device connected to the controller. An unlock signal on the higher priority slot 2, encoded to encompass slot 0, can also unlock the device bay controller. FIG. 7 illustrates that the field bits are programmed during power on, and therefore the slot assignment register is a write once register ("WO").

It will be appreciated to those skilled in the art having the benefit of this disclosure that the embodiments described above are believed to be capable of programmably securing devices coupled to a peripheral bus, or devices simply deemed "hardware resources". Such hardware resources include electromechanical devices which may allow disconnect of a hood which surrounds the computer itself. As such, a hood latch can be deemed a hardware resource (and thus a "device") whereby an unlock signal on a slot can be mapped to an electromechanical hood latch by virtue of the slot assignment register. For example, a hood latch may be designed so that only the system administrator will grant access to the computer. This means that possibly the hood latch will respond only to a slot 2 unlock signal. Accordingly, field H in FIG. 6 may be programmed with a 011 code as shown in FIG. 7. Other hardware resources or devices may be registers such as configuration registers within input/output controllers or interface units. There are possibly numerous other types of devices which can be periodically secured so that access is granted to those devices (or other devices secured by those devices) only if the entered password matches a previously stored password. Various modifications and changes may be made as would be obvious to a person skilled in the art having the benefit of this disclosure. It is intended that the following claims be interpreted to embrace all such modifications and changes and, accordingly, the specification and drawings are to regarded in an illustrative rather than a restrictive sense.

What is claimed is:

1. A computer system incorporating a plurality of securable hardware devices, said computer system comprising:
   a keyboard;
   a storage unit operably coupled to the keyboard to produce an unlock signal upon an output conductor of the storage unit if a stored password within the storage unit favorably compares with a password entered upon the keyboard; and
   a register operably coupled to the storage unit to direct the unlock signal to a first set of the plurality of hardware devices during a first time and to direct the unlock signal to a second set of the plurality of hardware devices partially dissimilar from the first set during a second time subsequent to the first time, wherein the register comprises a plurality of fields, each of which is assigned to a different one of the plurality of securable hardware devices.

2. The computer system as recited in claim 1, wherein the keyboard comprises any input device into which a user can forward a password.

3. The computer system as recited in claim 1, wherein the storage unit comprises memory elements which receive the stored password from a non-volatile memory device during boot-up of the computer system.

4. The computer system as recited in claim 3, wherein the non-volatile memory device is one of the plurality of hardware devices.

5. The computer system as recited in claim 1, wherein one of the plurality of fields is programmed to map the unlock signal to the respective one of the plurality of hardware devices.

6. The computer system as recited in claim 5, wherein the unlock signal is mapped based on the unlock signal being routed on the conductor, or slot, associated with the programmed field.

7. The computer system as recited in claim 1, wherein the register is operably coupled to direct another unlock signal upon another output conductor of the storage unit to at least a portion of the first set of the plurality of hardware devices.

8. The computer system as recited in claim 1, wherein the register is operably coupled to direct another unlock signal upon another output conductor of the storage unit to each of the plurality of hardware devices.

9. A bus interface unit coupled between a plurality of buses upon which a plurality of hardware devices are coupled, said bus interface unit comprising:

a storage unit configured to retain a first stored password and a second stored password;

a comparator coupled to the storage unit for comparing a first user entered password and a second user entered password against the first and second stored passwords and to present a first unlock signal from a first slot and a second unlock signal from a second slot if the first and second user entered passwords favorably compare with respective first and second stored passwords; and a register operably coupled to the comparator for programmably mapping the first slot to a first grouping of the plurality of hardware devices and for mapping the second slot to a second grouping of the plurality of hardware devices, an encoder operably coupled between the comparator and the register, wherein the encoder is configured to modify the mapping of the first slot and to modify the mapping of the second slot.

10. The bus interface unit as recited in claim 9, wherein the first grouping of hardware devices is a subset of the second grouping of hardware devices.

11. The bus interface unit as recited in claim 10, wherein the first grouping of hardware devices are unlocked in response to either (i) the first unlock signal forwarded thereto via the mapped first slot, or (ii) the second unlock signal forwarded thereto via the mapped second slot.

12. The bus interface unit as recited in claim 9, wherein the first user entered password is presented to the comparator from a keyboard directly coupled to one of the plurality of buses, and wherein the second user entered password is presented to the comparator from a keyboard remotely coupled to one of the plurality of buses.

13. A method for unlocking a plurality of securable hardware devices operably connected to a computer system, comprising:

comparing a user-entered password against a stored password;

presenting a first unlock signal upon a first slot conductor if the user-entered password is the same as the stored password;

mapping the first slot conductor to a first grouping of the plurality of securable hardware devices during a first time; and mapping the first slot conductor to a second grouping of the plurality of securable hardware devices during a second time subsequent to the first time.

14. The method as recited in claim 13, wherein the second grouping is at least partially dissimilar from the first grouping.

15. The method as recited in claim 13, wherein the first and second groupings comprise at least one of the plurality of securable hardware devices.

16. The method as recited in claim 13, further comprising:

comparing a second user-entered password against a second stored password;

presenting a second unlock signal upon a second slot conductor if the second user-entered password is the same as the second stored password; and mapping the second slot conductor to each of the plurality of securable hardware devices.

17. The method as recited in claim 13, further comprising:

comparing a second user-entered password against a second stored password;

presenting a second unlock signal upon a second slot conductor if the second user-entered password is the same as the second stored password; and mapping the second slot conductor to a third grouping of the plurality of securable hardware devices.

18. The method as recited in claim 17, wherein the third grouping is substantially equal to the first grouping, and wherein either the unlock signal on the first slot conductor or the unlock signal on the second slot conductor will unlock the third or first grouping of securable hardware devices.

* * * * *